(12) United States Patent
Glendinning et al.

(10) Patent No.: US 10,613,269 B2
(45) Date of Patent: Apr. 7, 2020

(54) STACKED LIGHT WAVE GUIDES FOR DISPLAY PANELS

(71) Applicant: INTEL CORPORATION, Santa Clara, CA (US)

(72) Inventors: Duncan Glendinning, Chandler, AZ (US); Roland P. Wooster, Folsom, CA (US); Zhiming J. Zhuang, Sammamish, WA (US)

(73) Assignee: INTEL CORPORATION, Santa Clara, CA (US)

( * ) Notice: Subject to any disclaimer, the term of this patent is extended or adjusted under 35 U.S.C. 154(b) by 517 days.

(21) Appl. No.: 15/201,360

(22) Filed: Jul. 1, 2016

(65) Prior Publication Data

US 2018/0003888 A1    Jan. 4, 2018

(51) Int. Cl.
```
F21V 8/00       (2006.01)
G02F 1/1335     (2006.01)
G02F 1/1333     (2006.01)
```
(52) U.S. Cl.
CPC .............. *G02B 6/0076* (2013.01); *G02F 2001/133391* (2013.01); *G02F 2001/133601* (2013.01)

(58) Field of Classification Search
CPC ............... G02B 6/0076; G02B 6/0068; G02F 2001/133391
See application file for complete search history.

(56) References Cited

U.S. PATENT DOCUMENTS

| | | | | |
|---|---|---|---|---|
| 5,546,496 | A * | 8/1996 | Kimoto ................ | H01L 31/153 250/201.1 |
| 2011/0007524 | A1* | 1/2011 | Nagatani ............. | G02B 6/0061 362/616 |
| 2011/0227487 | A1* | 9/2011 | Nichol ................. | G02B 6/0018 315/158 |
| 2011/0254809 | A1* | 10/2011 | Yu ........................ | G06F 3/0421 345/175 |
| 2012/0069600 | A1* | 3/2012 | Lin ................... | B29D 11/00663 362/616 |
| 2015/0346495 | A1* | 12/2015 | Welch ................ | G02B 27/0172 345/8 |

* cited by examiner

*Primary Examiner* — Lucy P Chien

(57) ABSTRACT

Disclosed herein is a waveguide stack and associated segmented illumination display. The waveguide stack includes a number of waveguides stacked into an array to direct light from light emitting diode (LED) edge lights to a liquid crystal display (LCD) of a segmented illumination display. The waveguides are stacked with light inhibiting material between the waveguides to inhibit light transmitting through one waveguide from communicating to a second waveguide.

26 Claims, 13 Drawing Sheets

200

201

| 260-1 | 260-2 | 260-3 | 260-4 |
| 260-5 | 260-6 | 260-7 | 260-8 |
| 260-9 | 260-10 | 260-11 | 260-12 |
| 260-13 | 260-14 | 260-15 | 260-16 |

| 660-1 | 660-2 | 660-3 | 660-4 | 660-5 | 660-6 | 660-7 | 660-8 |
|---|---|---|---|---|---|---|---|
| 660-9 | 660-10 | 660-11 | 660-12 | 660-13 | 660-14 | 660-15 | 660-16 |
| 660-17 | 660-18 | 660-19 | 660-20 | 660-21 | 660-22 | 660-23 | 660-24 |
| 660-25 | 660-26 | 660-27 | 660-28 | 660-29 | 660-30 | 660-31 | 660-32 |
| 660-33 | 660-34 | 660-35 | 660-36 | 660-37 | 660-38 | 660-39 | 660-40 |

605

607

| 660-(8N-7) | 660-(8N-6) | 660-(8N-5) | 660-(8N-4) | 660-(8N-3) | 660-(8N-2) | 660-(8N-1) | 660-8N |
|---|---|---|---|---|---|---|---|

Stack a number of waveguides into an array of waveguides, the waveguides to direct light from an entrance pupil to an exit pupil.
1110

Dispose light inhibiting material between each of the waveguides in the waveguide stack.
1120

FIG. 11

STACKED LIGHT WAVE GUIDES FOR DISPLAY PANELS

TECHNICAL FIELD

Embodiments herein generally relate to display stacks and particularly to light guide panel components of display stacks for segmented illumination displays.

BACKGROUND

Some modern displays utilize light emitting diode (LED) technology as a light source. For example, a liquid crystal display (LCD) may use LEDs as a light source. In general, a number of LEDs are provided in a strip along with a light guide panel to channelize and diffuse the light emitted from the LEDs. LEDs and the light guide panel are combined with other display layers to form an LED edge lit LCD display. Such LED edge lit displays can be incorporated into a stand-alone display or into an all in one computing device, such as, for example, a smart phone, a tablet, or the like. Some applications provide segmented illumination of the display panel. More particularly, portions of the display panel can be individually illuminated. However, with respect to such segmented illumination devices; the number of portions with which the display can be segmented is limited to a 2× array, or the thickness of the display is limited. These constraints are significant as modern trends continue to require greater numbers of regions in segmented displays along with thinner and thinner devices.

BRIEF DESCRIPTION OF THE DRAWINGS

FIG. 2 illustrates a block diagram of a segmented display according to an embodiment.

FIG. 6 illustrates a block diagram of a segmented display according to an embodiment.

FIG. 11 illustrates a logic flow according to an embodiment.

DETAILED DESCRIPTION

Various embodiments may be generally directed to waveguide stacks to provide a display panel having segmented illumination. More specifically, the present disclosure provides a display panel having individually illuminable segments. Each segment can correspond to a waveguide and a light emitting diode (LED). The waveguides can be stacked to direct light from the LEDs to segments in the display.

The present disclosure can be implemented in high dynamic range (HDR) panels, all-in-one (AIO) devices, for example, tablets, smart phones, wearable devices, or the like. Conventionally, segmented illumination panels are implemented by either dividing a row (or column) of waveguides into two and edge lighting the waveguides from both sides of the display panel. Accordingly, the number of illumination segments is limited to either an M×2 array or a 2×M array. Although backlit panels can have an M×N array of illumination segments, the thickness of the panel is limited by the LED emission cone angle and spacing pitch. The thickness of the panel might be reduced by increasing the number of LEDs in the backlight array, however, this increases both cost and heat output of the panel, and is therefore, not practical.

The present disclosure provides a set of stacked waveguides and corresponding edge lit LED light bar to illuminate the waveguides. The stacked waveguide can be implemented to illuminate an M×N array of illumination segments in a display panel. The LEDs are arranged to emit light into the waveguides and can be individually controlled to individually illuminate the segments in the panel and provide segmented illumination. The stacked waveguides can comprise layers of waveguides with a light inhibiting layer interposed between the waveguides in the stack.

Figure 1:
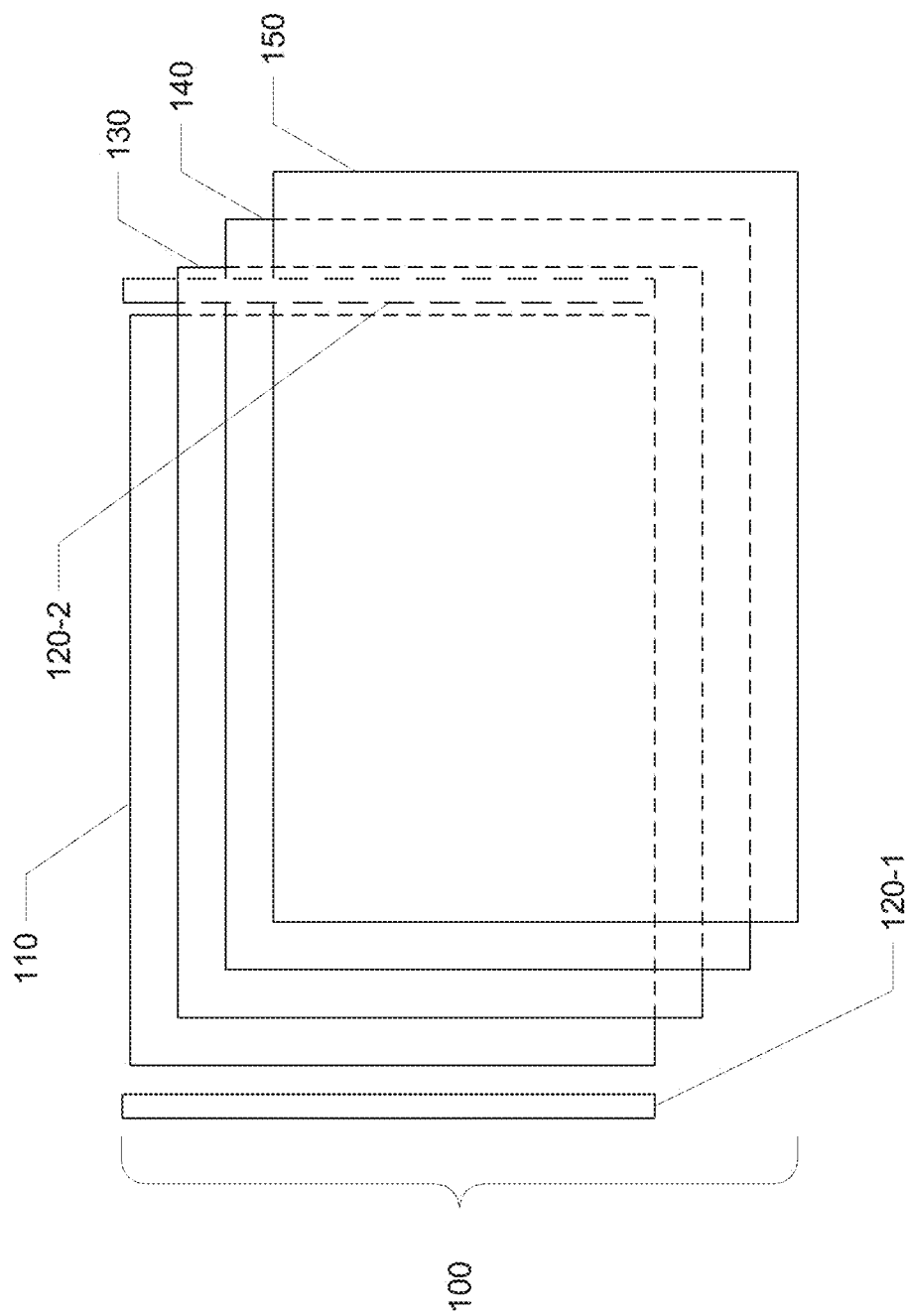
FIG. 1 illustrates a display stack including a waveguide stack according to an embodiment.

FIG. 1 illustrates a block diagram of a display stack 100. In various examples, the display stack 100 may include a display carrier 110, LED edge light portions 120-1 and 120-2, a light guide panel (LGP) layer 130, an LCD layer 140, and a protective layer 150. It is important to note, that the display stack 100 can include more layers than depicted, less layers than depicted, or different configurations of layers than depicted. For example, reflective layers, diffusive layers, or the like may be included. However, it is noted that an exhaustive depiction and listing of the number and variety of layers that may be included in the display stack 100 is not made for purposes of brevity. The components of the display stack 100 depicted in FIG. 1 are selected for purposes of clarity of presentation only and not to be limiting. Importantly, the display stack 100 includes the LED edge light portions 120-1 and 120-2 and an LGP layer 130 comprising stacked waveguides.

A more detailed descriptions of the LGP layer 130, and particularly, stacked waveguides in the LGP layer 130 is given below, for example, with respect to FIGS. 3-4, 7-8, and 10. However, in general, the LGP layer 130 is arranged to channel light emitted from the LED edge light portions 120-1 and 120-2 to the LCD layer 140. In particular, the LGP layer 130 comprises a number of stacked waveguides with a light inhibiting layer interposed between the waveguides in the stack. Each of the waveguides is arranged to illuminate a particular region, or segment, of the display stack 100. Accordingly, segments of the display stack 100 can be individually illuminated by directing light into selected waveguides of the LGP layer 130. As such, a display having M×N illumination segments can be provided.

The display carrier 110 may be formed from a variety of materials and to a variety of physical dimensions and specifications. It is to be appreciated, that the materials and dimensions of the display carrier 110 may be based on the display and/or device to which the display carrier is to be implemented. The LED edge light portions 120-1 and 120-2 may comprise a number of individual LEDs (refer to FIGS. 5 and 9). The LEDs can be mounted to the display carrier, mounted to another substrate, or the like. It is noted, the LEDs of the LED edge light portions 120-1 and 120-2 may be individually controlled (e.g., on/off, dimmable, or the like) to selectively illuminate different segments of the display 100.

The LCD layer 140 may include one or more panels or components to control portions of the display (e.g., pixels). It is to be appreciated that a variety of LCD technologies exists and the present disclosure may be implemented with any of these or future such display technologies. For example, the present disclosure may be implemented using passive and/or active LCD technology. As a particular example, the LCD layer 140 may include thin-film transistor (TFT) components, twisted nematic (TN) components, in plane switching (IPS) components, vertical alignment (VA) components, and/or the like. The protective layer 150 may comprise one or more films, layers, or components to protect the LCD layer 140 and the display stack 100. For example, the protective layer 150 may be glass, acrylic, or the like.

The display stack 100 may be implemented in a variety of displays and/or devices including displays. For example, the display stack 100 may be implemented in a monitor, a television, a smart phone, a Ultrabook, a tablet, a laptop, a wearable computing device (e.g., a watch, glasses, a headset, or the like), a home automation device (e.g., a thermostat, a control panel, or the like). Furthermore, as noted above, the display stack 100 may include additional and/or different layers than depicted. For example, the display stack 100 may be implemented with various touch (e.g., capacitive, or the like) layers, diffusive layers, privacy layer, pressure layers, etc. Examples are not limited in this context.

Figure 3:
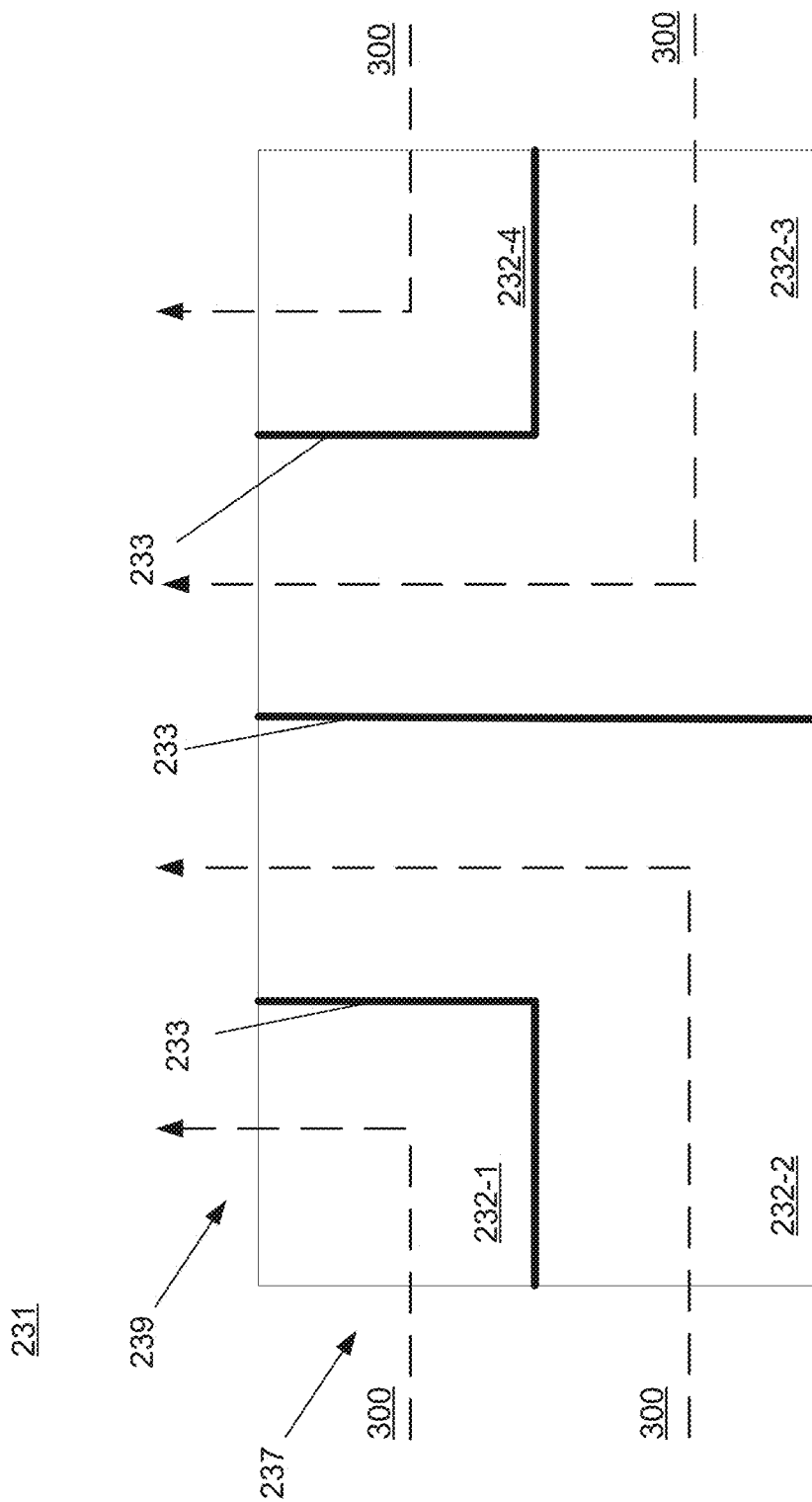
FIGS. 3-4 illustrates an example of a waveguide stack of the segmented display of FIG. 2 according to an embodiment.
Figure 4:
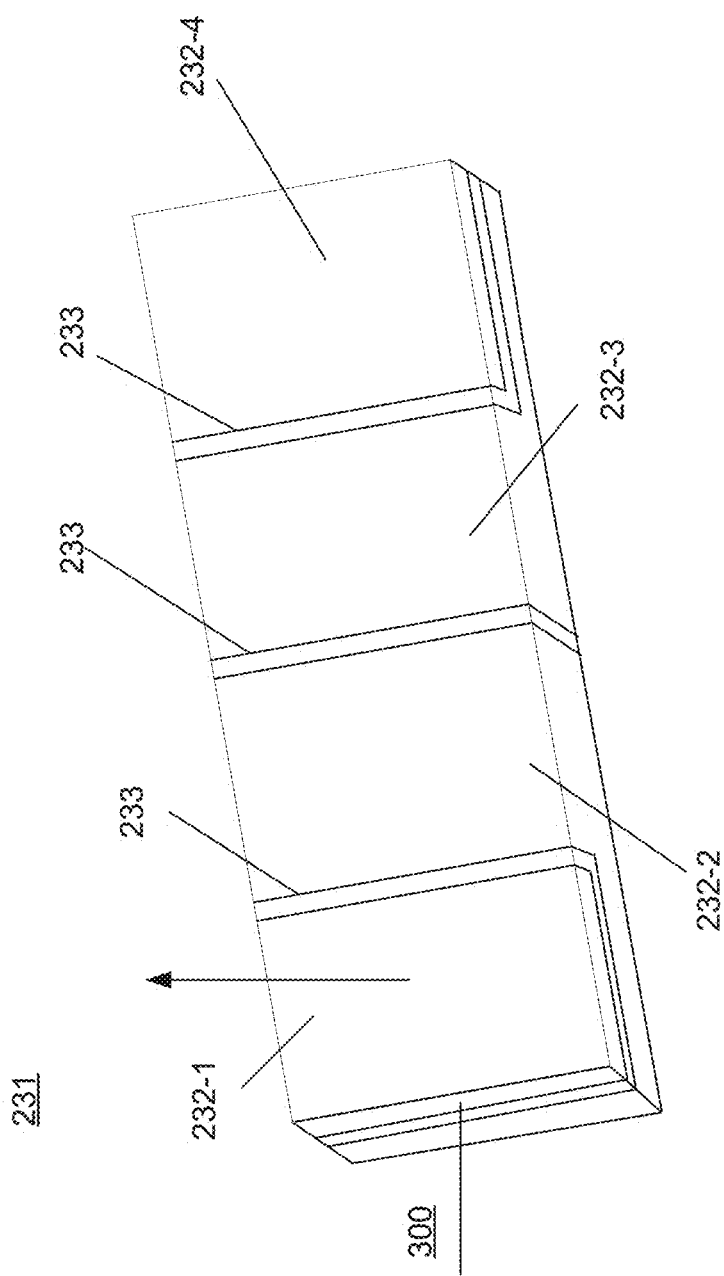
Figure 5:
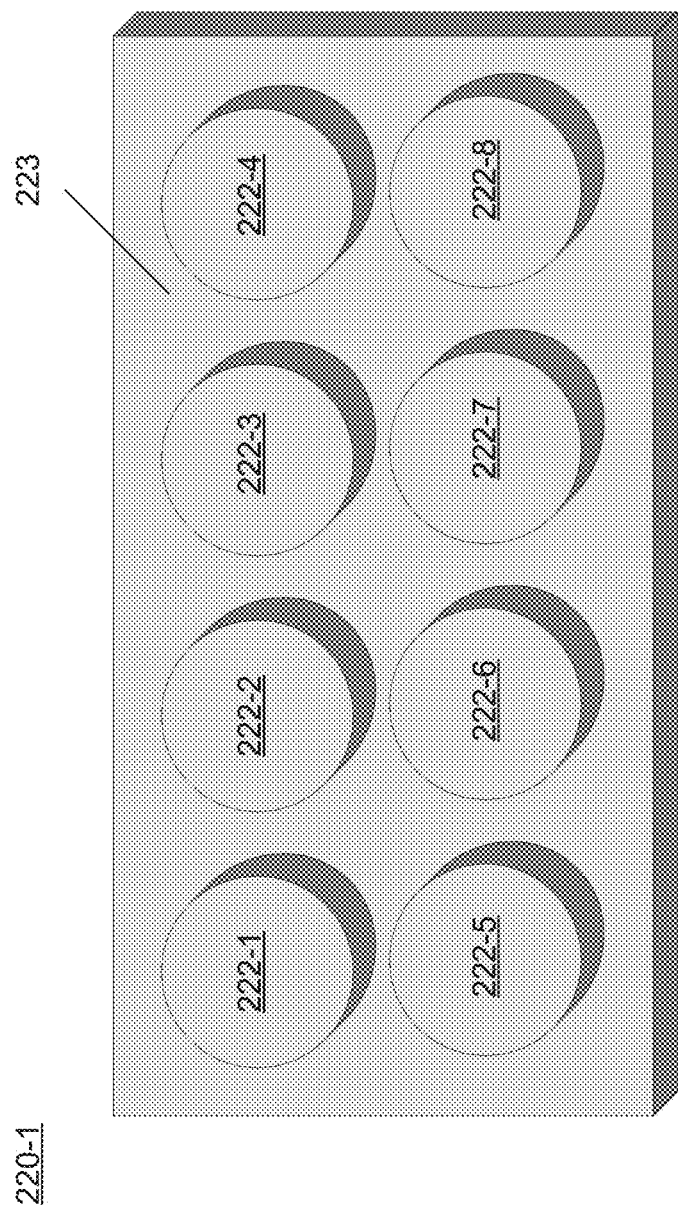
FIG. 5 illustrates an example of LED edge lights of the segmented display of FIG. 2 according to an embodiment.
Figure 7:
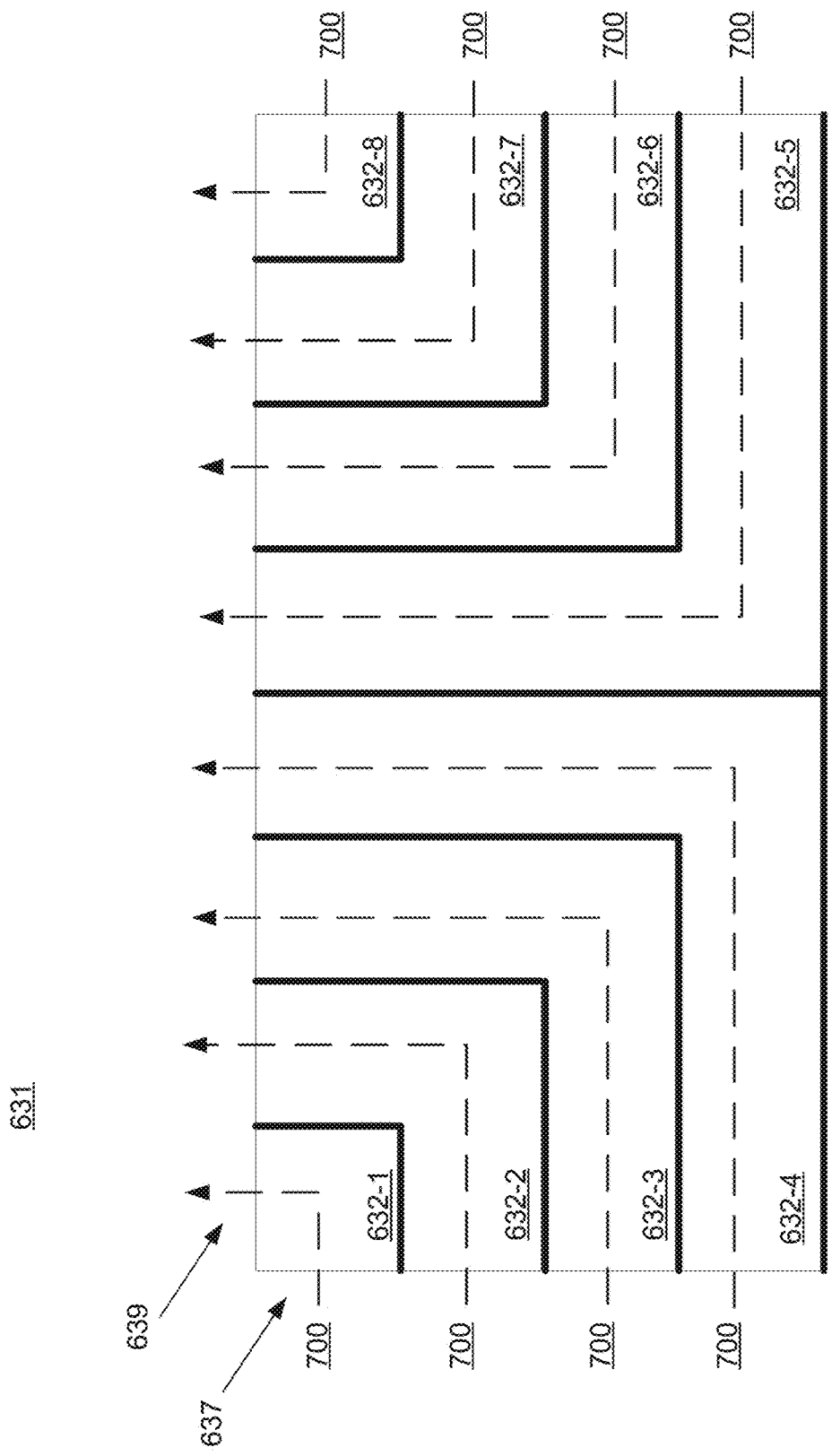
FIGS. 7-8 illustrates an example of a waveguide stack of the segmented display of FIG. 6 according to an embodiment.
Figure 8:
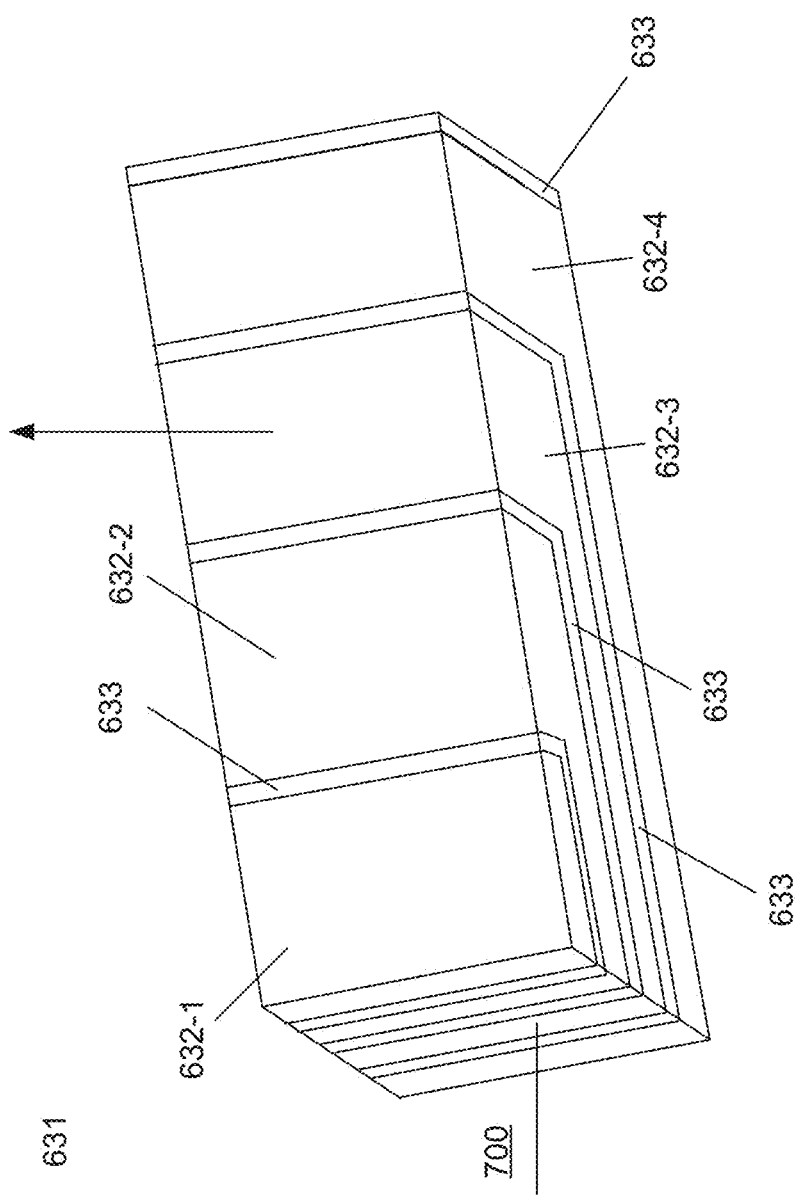
Figure 9:
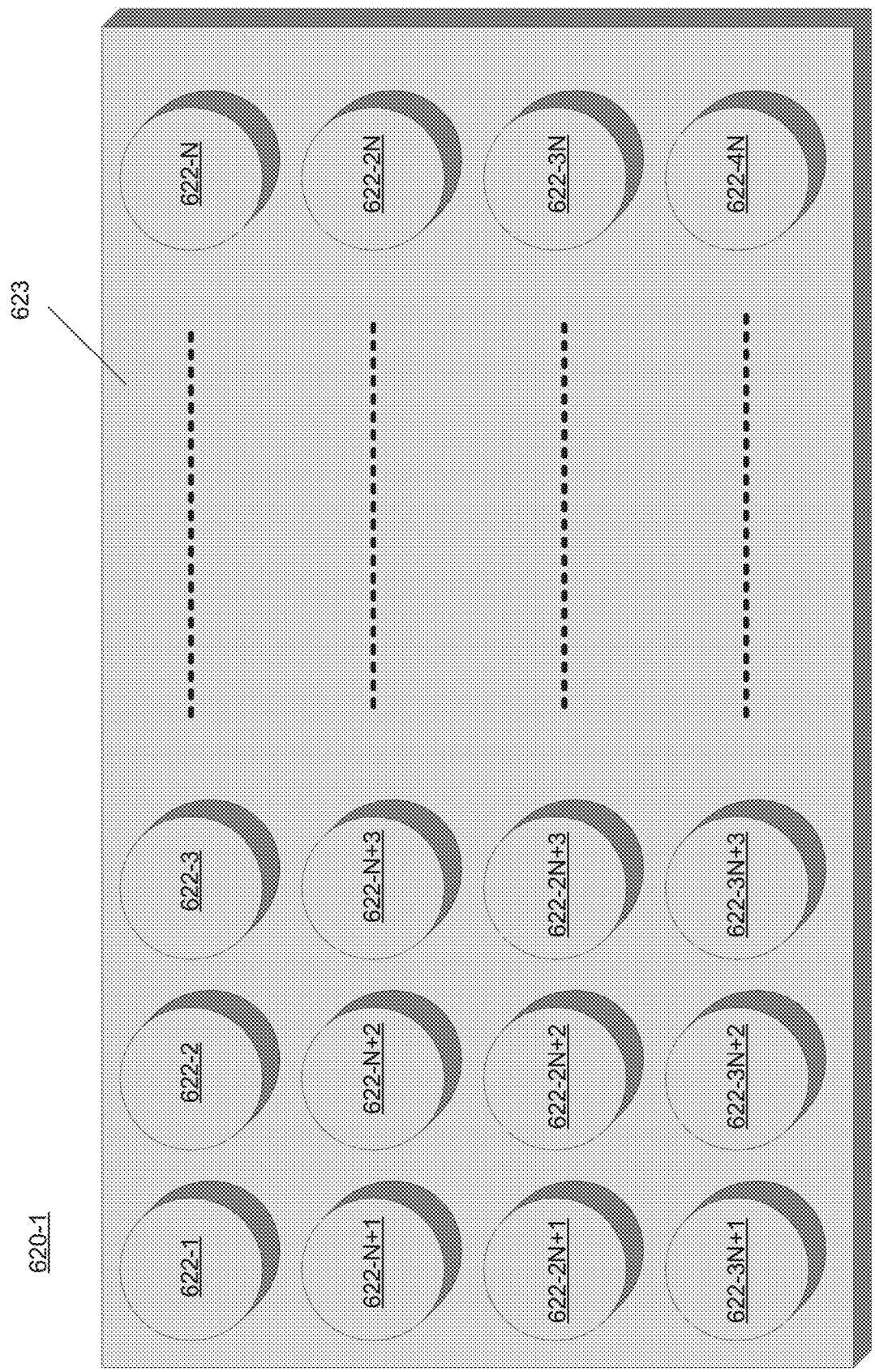
FIG. 9 illustrates an example of LED edge lights of the segmented display of FIG. 6 according to an embodiment.

FIGS. 2-9 illustrate example display panels having illumination segments and corresponding LGP layer and LED edge light portions. In particular, FIG. 2 depicts a display 200 having a 4×4 array of illumination segments while FIG. 6 depicts a display 600 having an 8×N array of illumination segments. FIGS. 3-4 depict views of an example LGP layer for the display 200 while FIGS. 7-8 depict views of an example LGP layer for the display 600. FIG. 5 depicts an example LED edge light portion for the display 200 while FIG. 9 depicts an example LED edge light portion for the display 600. It is noted, that the example LGP layers, and particularly, the waveguide stacks described herein, are given for example only. More specifically, the present disclosure can be implemented to provide an edge lit display having an M×N array of illumination segments. The depicted 4×4 and 8×N arrays are given for purposes of explanation and not to be limiting.

Turning more specifically to FIG. 2, a top view of example display panel 200 is depicted. It is noted, the example display panel 200 is described with reference to the display stack 100 of FIG. 1. However, examples are not limited in this context. The display panel 200 includes illumination segments 260. In particular, 16 total illumination segments, arranged in a 4×4 array, are depicted. For example, the top most row in the array includes illumination segments 260-1, 260-2, 260-3, and 260-4. In general, the display panel 200 includes a waveguide for each illumination segment. More specifically, a waveguide stack including a number of waveguides can be provided (e.g., as an LGP layer of the display panel, or the like). Each illumination segment 260 can correspond to at least one waveguide in the stack. Additionally, edge light portions including a number of LEDs can be provided. At least one LED for each waveguide can be provided in the LED edge light portions. Accordingly, light can be selectively emitted into any combination of the waveguides in the stack to illuminate any combination of the illumination segments 260.

The display panel 200 is edge lit. More specifically LED edge light portions (e.g., LED edge light portions 120-1 and 120-2, or the like) are disposed along an edge of the display. In some examples, LED edge light portions can be disposed along a top edge 201 and a bottom edge 203 of the display panel 200. In some examples, LED edge light portions can be disposed adjacent to side edges 205 and 207 of the display panel 200. The example display panel 200 is described with reference to being edge lit from the sides 205 and 207. However, examples are not limited in this context.

Turning more particularly to FIG. 3, a cut-away side view of an example waveguide stack 231 is depicted. The example waveguide stack 231 can be implemented as part of an LGP layer (e.g., LGP layer 130, or the like) of the display panel 200. The waveguide stack includes a number of waveguides 232, stacked in an arrangement to direct light from the edge of the display panel to the illumination segments. It is noted, that view of the waveguide stack 231 depicted in this figure shows a cut-away side view. As such, only a portion of the waveguide stack 231 is visible. The portion of the waveguide stack 231 depicted in this figure can correspond to a row or column of the entire waveguide stack. This is explained in greater detail below.

The waveguide stack 231 includes waveguides 232 in a stacked arrangement to direct light 300 from edges of the display panel 200 towards illumination segments 260. More specifically, the waveguides 232 are arranged to direct light 300 from edges 205 and 207 towards the top surface of the display panel (e.g., LCD layer 140, or the like) and illumination segments 260. In the example depicted here, each waveguide 232 can correspond to an illumination segment. For example, waveguides 232-1, 232-2, 232-3, and 232-4 are depicted. The waveguide 232-1 can correspond to the illumination segment 260-1, the waveguide 232-2 can correspond to the illumination segment 260-2, the waveguide 232-3 can correspond to the illumination segment 260-3, and the waveguide 232-4 can correspond to the illumination segment 260-4. During operation, light 300 can be emitted from LED edge light portions (e.g., refer to FIG. 5) and can propagate through the waveguides 232. Accordingly, light 300 can be directed from the edges 205 and 207 towards illumination segments 260. It is noted, that more than one waveguide can correspond to a single illumination segment 260. Examples are not limited in this context. In particular, the waveguides 232 can include an entrance pupil (e.g., where light 300 enters the waveguide) and an exit pupil (e.g., where light 300 exits the waveguide) as depicted in these figures. For example, entrance pupil 237 and exit pupil 239 are depicted for waveguide 232-1.

Light 300 can be directed from edge 205 through waveguide 232-1 to illumination segment 260-1. As another example, light 300 can be directed from edge 205 through waveguide 232-2 to illumination segment 260-2. As another example, light 300 can be directed from edge 207 through waveguide 232-3 to illumination segment 260-3. As another example, light 300 can be directed from edge 207 through waveguide 232-4 to illumination segment 260-4. It is noted, that as light 300 is emitted from LED edge light portions, it can be individually controlled. More specifically, light 300 can be directed into individual waveguides 232. As such, illumination segments 260 can be individually illuminated in any combination. That is, one of the illumination segments 260 (e.g., 260-13, or the like) could be illuminated or a number of the illumination segments (e.g., 260-9, 260-10, 260-13, and 260-14, or the like) could be illuminated. Using the display panel 200 depicted in FIG. 2, light 300 can be directed into waveguides 232-2 and 232-3 to illuminate the illumination segments 260-2 and 260-3.

The waveguide stack 231 further includes light inhibiting layers 233. The light inhibiting layers 233 are interposed between the waveguides 232 in the waveguide stack 231. As this figure depicts a slice, or cut-away view, light inhibiting layers 233 may also be interposed between rows (or columns in the case of a top and bottom edge lit display) of waveguides. For example, a light inhibiting layer 233 could be interposed between waveguides 232-1 and 232-5 (not depicted due to the perspective viewed).

In general, the light inhibiting layer 233 can be any material to maintain propagation of the light 300 within the waveguides 232. Said differently, the light inhibiting layer 233 prevents light 300 from exiting the waveguide 232, or from bleeding over into adjacent waveguides, while the light 300 propagates through the waveguides 232. For example, the light inhibiting layer 233 can prevent light 300 propagating through waveguide 232-1 from bleeding into waveguide 232-2.

In some examples, the light inhibiting layer 233 can be an opaque material. In some examples, the light inhibiting layer can be a reflective material. In some examples, the light inhibiting layer 233 can be a layer of material sandwiched between waveguides 232 during manufacturing of the waveguide stack 231. In some examples, the light inhibiting layer 233 can be deposited onto portions of the waveguides 232 during manufacturing. In some examples, the light inhibiting layer can include aluminum. In general, the light inhibiting layer 233 can be any material with an index of refraction that is substantially higher than the index of refraction of the waveguides 232.

In general, the waveguides 232 can be any optical waveguide. In some examples, the waveguides 232 can include optical fibers. In some examples, the waveguides 232 can include rectangular waveguides (e.g., as depicted). In some examples, the waveguides can be planar, strip, or fiber waveguides. In some examples, the waveguides can include glass, polymer, semiconductor material, or the like.

Turning more specifically to FIG. 4, a perspective view of the portion of the waveguide stack 231 depicted in FIG. 3. As can be seen, the waveguide stack 231 includes at least waveguides 232-1, 232-2, 232-3, and 232-4. The waveguides 232 are arranged to direct light from an edge of the display panel 200 to a top surface of the display panel 200. For example, light 300 is depicted directed from edge 205 to top surface of the display panel 200 through waveguide 232-1. The light inhibiting layer 233 prevents light 300 from bleeding into waveguide 232-2 during transmission. As such, only the portion of the display panel over waveguide 232-1 is illuminated. More specifically, only illumination segment 260-1 is illuminated.

Turning more particularly to FIG. 5, LED edge light portion 220-1 is depicted. The LED edge light portion can be disposed along an edge (e.g., the edge 201, the edge 203, the edge 205, the edge 207, or the like) of the display stack (e.g., the display stack 100) to selectively direct light into individual waveguides. As such, individual illumination segments 260 of the display panel 200 can be illuminated. The LED edge light portion 220-1 can include LEDs 222. In particular, the portion 220-1 is depicted including LEDs 222-1, 222-2, 222-3, 222-4, 222-5, 222-6, 222-7, and 222-8. The LEDs 222 can be disposed on a substrate 223. Each of the LEDs 222 can correspond to one of the waveguides 232 in the waveguide stack 231. It is noted, that more than one LED could be provided for each waveguide. Examples are not limited in this context.

Turning more specifically to FIG. 6, a top view of example display panel 600 is depicted. It is noted, the example display panel 600 is described with reference to the display stack 100 of FIG. 1. However, examples are not limited in this context. The display panel 600 includes illumination segments 660. In particular, 8×N total illumination segments, arranged in a 8×N array, are depicted. For example, the top most row in the array includes illumination segments 660-1, 660-2, 660-3, 660-4, 660-5, 660-6, 660-7, and 660-8. In general, the display panel 600 includes a waveguide for each illumination segment. More specifically, a waveguide stack including a number of waveguides can be provided (e.g., as an LGP layer of the display panel, or the like). Each illumination segment 660 can correspond to at least one waveguide in the stack. Additionally, edge light portions including a number of LEDs can be provided. At least one LED for each waveguide can be provided in the LED edge light portions. Accordingly, light can be selectively emitted into any combination of the waveguides in the stack to illuminate any combination of the illumination segments 660.

The display panel 600 is edge lit. More specifically LED edge light portions (e.g., LED edge light portions 120-1 and 120-2, or the like) are disposed along an edge of the display. In some examples, LED edge light portions can be disposed along a top edge 601 and a bottom edge 603 of the display panel 600. In some examples, LED edge light portions can be disposed adjacent to side edges 605 and 607 of the display panel 600. The example display panel 600 is described with reference to being edge lit from the sides 605 and 607. However, examples are not limited in this context.

Turning more particularly to FIG. 7, a cut-away side view of an example waveguide stack 631 is depicted. The example waveguide stack 631 can be implemented as part of an LGP layer (e.g., LGP layer 130, or the like) of the display panel 600. The waveguide stack 631 includes a number of waveguides 632, stacked in an arrangement to direct light from the edge of the display panel to the illumination segments. It is noted, that view of the waveguide stack 631 depicted in this figure shows a cut-away side view. As such, only a portion of the waveguide stack 631 is visible. The portion of the waveguide stack 631 depicted in this figure can correspond to a row of the entire waveguide stack. This is explained in greater detail below.

The waveguide stack 631 includes waveguides 632 in a stacked arrangement to direct light 700 from edges of the display panel 600 towards illumination segments 660. More specifically, the waveguides 632 are arranged to direct light 700 from edges 605 and 607 towards the top surface of the display panel (e.g., LCD layer 140, or the like) and illumination segments 660. In the example depicted here, each waveguide 632 can correspond to an illumination segment. For example, waveguides 632-1, 632-2, 632-3, 632-4, 632-5, 632-6, 632-7, and 632-8 are depicted. The waveguide 632-1 can correspond to the illumination segment 660-1, the waveguide 632-2 can correspond to the illumination segment 660-2, the waveguide 632-3 can correspond to the illumination segment 660-3, the waveguide 632-4 can correspond to the illumination segment 660-4, the waveguide 632-5 can correspond to the illumination segment 660-5, etc. During operation, light 700 can be emitted from LED edge light portions (e.g., refer to FIG. 9) and can propagate through the waveguides 632. Accordingly, light 700 can be directed from the edges 605 and 607 towards illumination segments 660. It is noted, that more than one waveguide can correspond to a single illumination segment 660. Examples are not limited in this context.

Light 700 can be directed from edge 605 through waveguide 632-1 to illumination segment 660-1. As another example, light 700 can be directed from edge 205 through waveguide 632-2 to illumination segment 660-2. As another example, light 700 can be directed from edge 607 through waveguide 632-5 to illumination segment 660-5. As another example, light 700 can be directed from edge 607 through waveguide 632-8 to illumination segment 660-8. It is noted, that as light 700 is emitted from LED edge light portions, it can be individually controlled. More specifically, light 700 can be directed into individual waveguides 632. As such, illumination segments 660 can be individually illuminated in any combination. That is, one of the illumination segments 660 (e.g., 660-7, or the like) could be illuminated or a number of the illumination segments (e.g., 660-6, 660-7, 660-8, 660-14, 660-15, and 660-16, or the like) could be illuminated. Using the display panel 600 depicted in FIG. 6, light 700 can be directed into waveguides 632-2 and 632-3 to illuminate the illumination segments 660-2 and 660-3. In particular, the waveguides 632 can include an entrance pupil (e.g., where light 700 enters the waveguide) and an exit pupil (e.g., where light 700 exits the waveguide) as depicted in these figures. For example, entrance pupil 637 and exit pupil 639 are depicted for waveguide 632-1.

The waveguide stack 631 further includes light inhibiting layers 633. The light inhibiting layers 633 are interposed between the waveguides 632 in the waveguide stack 631. As this figure depicts a slice, or cut-away view, light inhibiting layers 633 may also be interposed between rows (or columns in the case of a top and bottom edge lit display) of waveguides. For example, a light inhibiting layer 633 could be interposed between waveguides 631-1 and 632-9 (not depicted due to the perspective viewed).

In general, the light inhibiting layer 633 can be any material to maintain propagation of the light 700 within the waveguides 632. Said differently, the light inhibiting layer 633 prevents light 700 from exiting the waveguide 632, or from bleeding over into adjacent waveguides, while the light 700 propagates through the waveguides 632. For example, the light inhibiting layer 633 can prevent light 700 propagating through waveguide 632-1 from bleeding into waveguide 632-2.

In some examples, the light inhibiting layer 633 can be an opaque material. In some examples, the light inhibiting layer can be a reflective material. In some examples, the light inhibiting layer 633 can be a layer of material sandwiched between waveguides 632 during manufacturing of the waveguide stack 631. In some examples, the light inhibiting layer 633 can be deposited onto portions of the waveguides 632 during manufacturing. In some examples, the light inhibiting layer can include aluminum. In general, the light inhibiting layer 633 can be any material with an index of refraction that is substantially higher than the index of refraction of the waveguides 632.

In general, the waveguides 632 can be any optical waveguide. In some examples, the waveguides 632 can include optical fibers. In some examples, the waveguides 632 can include rectangular waveguides (e.g., as depicted). In some examples, the waveguides can be planar, strip, or fiber waveguides. In some examples, the waveguides can include glass, polymer, semiconductor material, or the like.

Turning more specifically to FIG. 8, a perspective view of the portion of the waveguide stack 631 depicted in FIG. 7. As can be seen, the waveguide stack 631 includes at least waveguides 632-1, 632-2, 632-3, 632-4. The waveguides 632 are arranged to direct light from an edge of the display panel 600 to a top surface of the display panel 600. For example, light 700 is depicted directed from edge 605 to top surface of the display panel 600 through waveguide 632-1. The light inhibiting layer 633 prevents light 700 from bleeding into waveguide 632-2 during transmission. As such, only the portion of the display panel over waveguide 631-1 is illuminated. More specifically, only illumination segment 660-1 is illuminated.

Turning more particularly to FIG. 9, LED edge light portion 660-1 is depicted. The LED edge light portion can be disposed along an edge (e.g., the edge 601, the edge 603, the edge 605, the edge 607, or the like) of the display stack (e.g., the display stack 100) to selectively direct light into individual waveguides. As such, individual illumination segments 660 of the display panel 600 can be illuminated. The LED edge light portion 620-1 can include LEDs 622. In particular, the portion 620-1 is depicted including LEDs 622-1, 622-2, 622-3, 622-4, 622-5, 622-6, 622-7, 622-8, 622-9, 622-10, 622-11, 622-12, 622-13, 622-14, 622-15, 622-16 through 622-N/2. The LEDs 622 can be disposed on a substrate 623. Each of the LEDs 622 can correspond to one of the waveguides 632 in the waveguide stack 631. It is noted, that more than one LED could be provided for each waveguide. Examples are not limited in this context.

Figure 10:
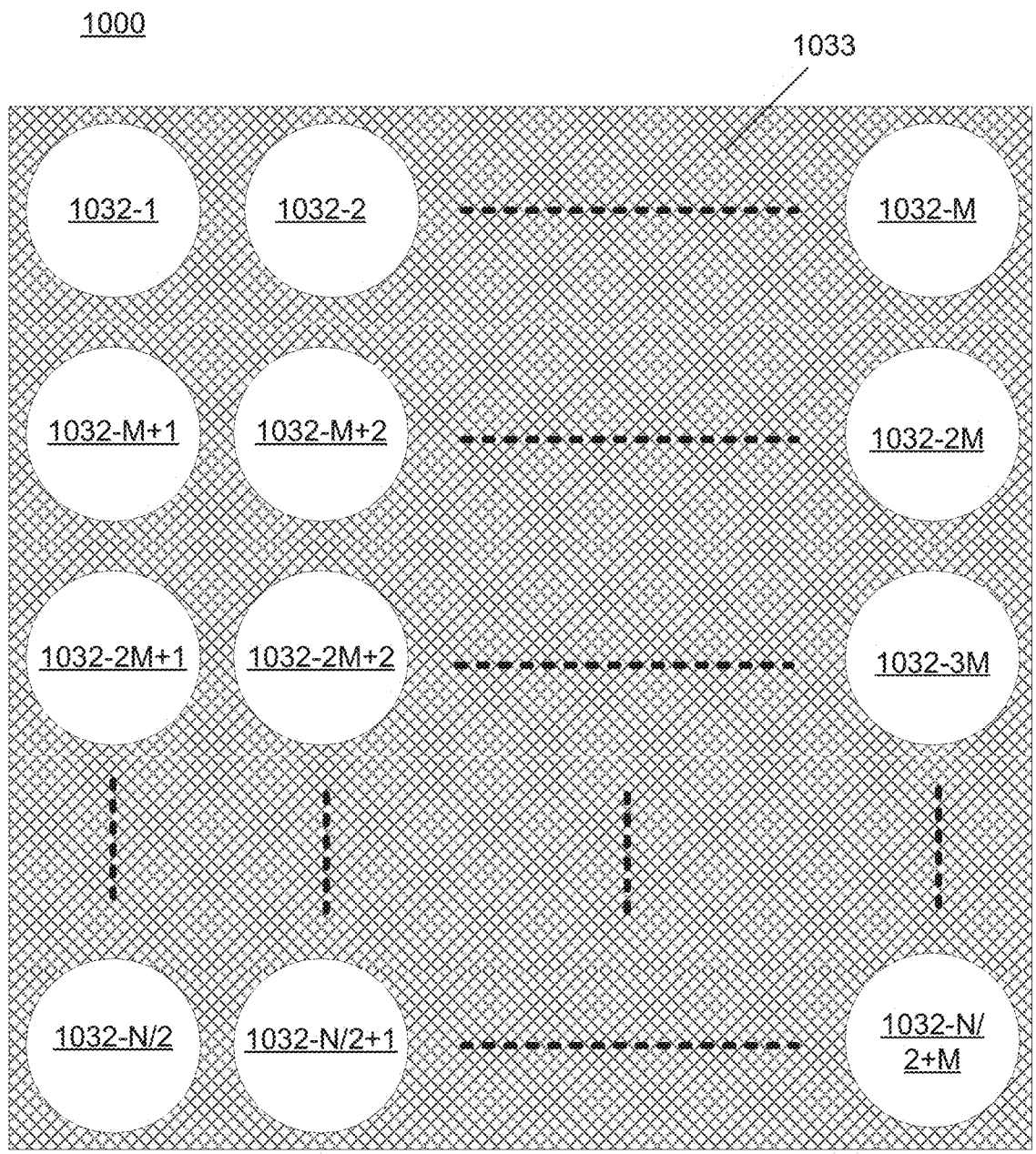
FIG. 10 illustrates an example of a waveguide stack according to an embodiment.

FIG. 10 depicts an on-end view of an example waveguide stack 1000. The example waveguide stack 1000 can be implemented as a waveguide stack to in a segmented illumination display, such as, the display stack 100, the display panel 200, the display panel 600, or the like. In general, the waveguide stack 1000 includes waveguides and light inhibiting layers as described above for the waveguide stacks 231 and 631. In particular, the waveguide stack 1000 includes waveguides 1032 arranged in a stack to direct light from an edge of a display towards illumination segments in the display. However, as can be seen, the waveguides 1032 are circular in shape. It is noted, that any shape of waveguide could be implemented. For example, square or rectangular (e.g., as depicted in FIGS. 3-4 and 7-8, oval, or another shape configured to direct light along the length of the waveguide.

The waveguide stack 1000 include M×N waveguides, arranged to direct light from edges of a display panel towards the top surface (e.g., LCD layer 140, or the like) of a display panel and illumination segments of the display panel. In the example depicted here, each waveguide 1032 can correspond to an illumination segment.

As illustrated, waveguides 1032 are depicted from an end view (e.g., entrance pupil to the waveguides, or the like). Accordingly, only M×N/2 waveguides are depicted. More specifically, the opposite side the waveguide stack (obscured by this perspective view) could include the other M×N/2 waveguides. As such, waveguides 1032-1, 1032-2, through 1032-M×N/2 waveguides are depicted. The waveguides are arranged in an M×(N/2) array to provide that light can be selectively directed to illumination segments in a display panel as described herein.

The waveguide stack 1031 further includes light inhibiting layers 1033. The light inhibiting layers 1033 are interposed between the waveguides 1032 in the waveguide stack 1000. In general, the light inhibiting layer 1033 can be any material to maintain propagation of the light within the waveguides 1032. Said differently, the light inhibiting layer 1033 prevents light from exiting the waveguide 1032, or from bleeding over into adjacent waveguides, while the light propagates through the waveguides 1032. For example, the light inhibiting layer 1033 can prevent light propagating through waveguide 1032-1 from bleeding into waveguide 1032-2, waveguide 1032-M+1 and waveguide 1032-M+2.

FIG. 11 depicts a logic flow 1100 for forming a waveguide stack. The logic flow 1100 can be implemented to form a waveguide stack as described herein. In particular, the logic flow 1100 can be implemented to form waveguide stacks, 231, 631, or 1000. The logic flow 1100 could also be implemented to form waveguide stacks having a different configurations (e.g., number of array elements, or the like) than the waveguide stacks 231, 631, or 1000. The logic flow 1100 is described with reference to the waveguide stack 231 of FIGS. 3-4. Examples, however, are not limited in this context.

The logic flow 1100 may begin at block 1110. At block 1110 "stack a number of waveguide into an array of waveguides, the waveguides to direct light from an entrance pupil to an exit pupil" a number of waveguides can be stacked into an array. For example, waveguides 232 can be stacked into an array. In particular, 16 waveguides 232 can be stacked into a 4×4 array. In some examples, 2 array of M×N, where M×N is the number of illumination segments in the display panel to which the waveguide stack is to be implemented, can be formed. More specifically, at block 1110, two stacks of waveguides can be formed. The stacks can subsequently be arranged end-to-end to form a waveguide stack 231 as depicted in FIG. 2.

Continuing to block 1120 "dispose light inhibiting material between each of the waveguides in the waveguide stack" light inhibiting material can be interposed between waveguides in the waveguide stack. For example, light inhibiting layer 233 can be interposed between waveguides 232.

In some examples, blocks 1110 and 1120 can be repeated iteratively to build the waveguide stack, or stack-up the waveguides to from the waveguide stack. For example, a first number of waveguides could be provided. The waveguides could be coated in light inhibiting material and arranged into a first layer of the stack. Subsequently, an additional number of waveguides could be provided, coated in light inhibiting material, and arranged into a second layer of the stack. In some examples, the waveguide stack can manufactured iteratively, for example, in layers, using various semiconductor manufacturing techniques, such as, for example deposition and etch techniques to build up waveguides in a stacked arrangement with light in habiting material between the waveguides as depicted.

Figure 12:
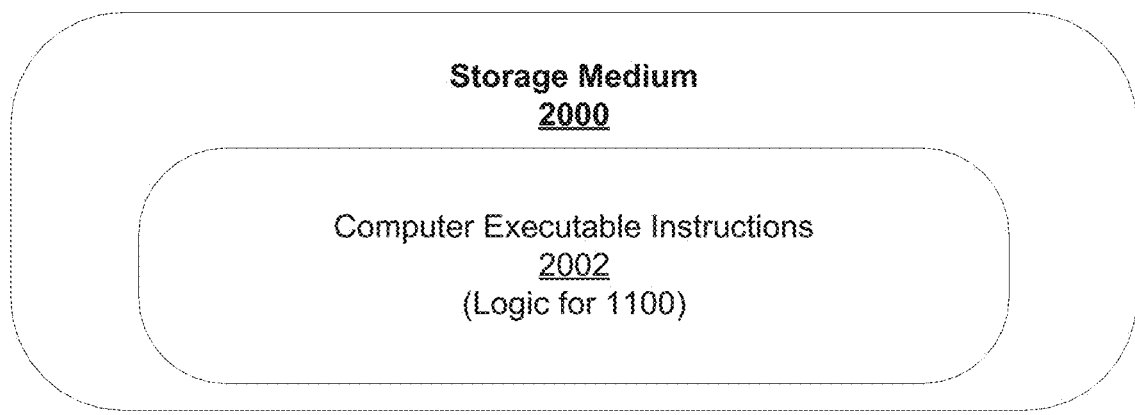
FIG. 12 illustrates a computer readable medium according to an embodiment.

FIG. 12 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 1100. For example, the storage medium 2000 may store various types of computer executable instructions to implement technique 700, which instructions can be executed by a specially programmed computer system operably coupled to manufacturing tools to carry out the waveguide stack manufacturing technique described herein.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 13:
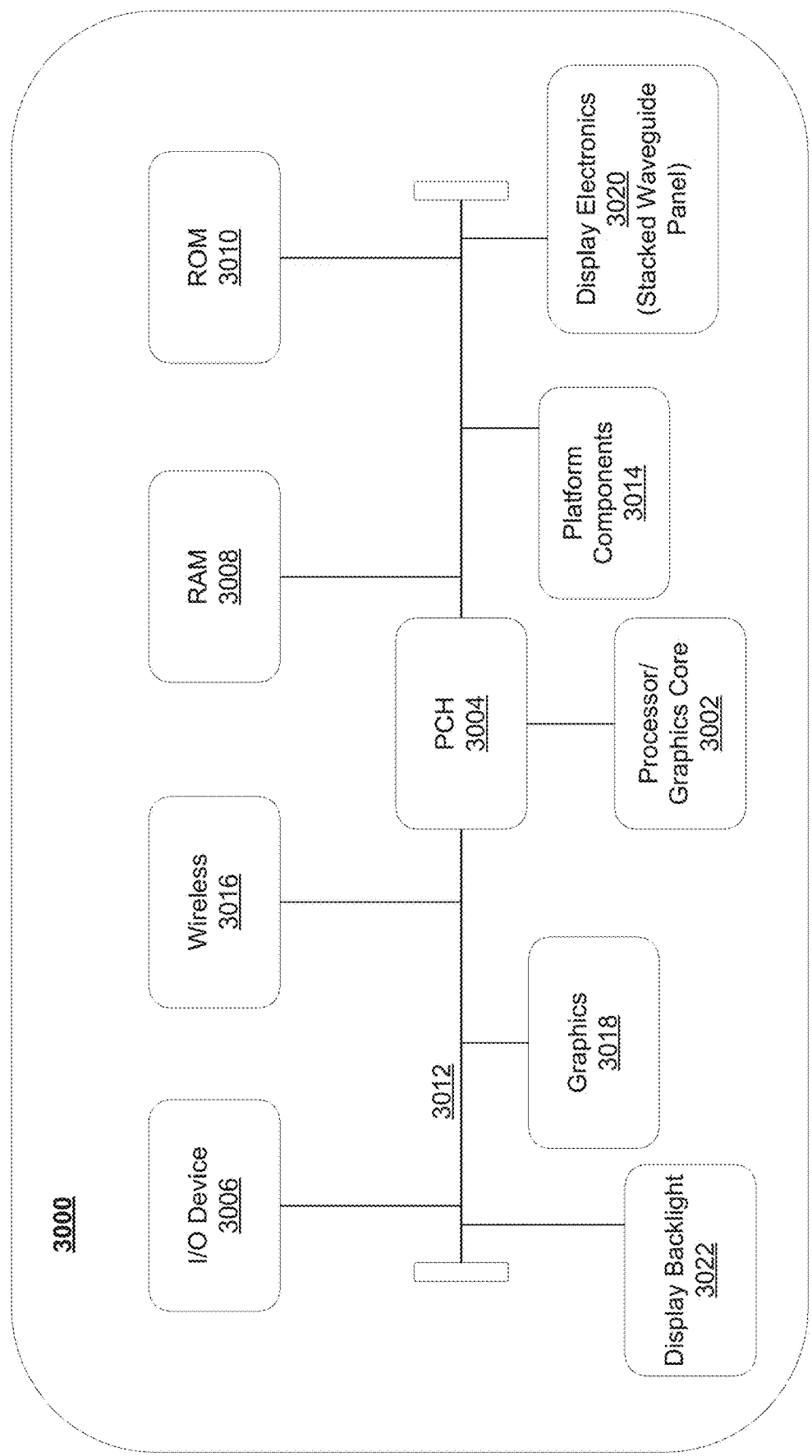
FIG. 13 illustrates a device according to an embodiment.

FIG. 13 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020 (e.g., display panel including a waveguide stack (e.g., waveguide stack 231, waveguide stack 631, waveguide stack 1000, or the like), projector 3022 (e.g., projector 110, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

A system, comprising: a display comprising a plurality of illumination segments arranged in an M×N array, where M and N are greater than 2 and at least one of M or N is greater than 4; a plurality of light emitting diode (LED) edge lights; a liquid crystal display (LCD) layer; and a waveguide stack to transmit light from the plurality of LED edge lights to the LCD layer, the waveguide stack comprising: a plurality of waveguides arranged in a stack, each of the plurality of waveguides to transmit light from a one of the plurality of LED edge lights to a portion of the LCD layer; and a plurality of light inhibiting layers interposed between each of the plurality of waveguides in the stack.

Example 2

The system of example 1, each of the plurality of waveguides comprising an entrance pupil to receive light from the plurality of LED edge lights and an exit pupil to emit light to the LCD layer.

Example 3

The system of example 2, the exit pupils of the plurality of waveguides disposed on a first surface of the waveguide stack, the entrance pupils of a first subset of the plurality of waveguides disposed on a second surface of the stack and the entrance pupils of a second subset of the plurality of waveguides disposed on a third surface of the stack.

Example 4

The system of example 3, the second surface parallel to the third surface.

Example 5

The system of example 3, the first surface perpendicular to the second surface and the third surface and the second surface parallel to the third surface.

Example 6

The system of example 3, each of the second surface and the third surface comprising an N/2×M array of entrance pupils, where M and N are greater than 2.

Example 7

The system of example 1, the first surface comprising an M×N array of exit pupils, wherein at least one of M or N are greater than 4.

Example 8

The system of example 7, the display comprising an M×N array of illumination segments.

Example 9

The system of example 1, the light inhibiting layer comprising an opaque material or a reflective material.

Example 10

The system of example 9, the light inhibiting layer comprising aluminum.

Example 11

The system of any one of examples 1 to 10, comprising: a housing, the display disposed in the housing; and at least one of a processing unit, radio, battery, or interface device disposed in the housing and operably coupled to the display.

Example 12

An apparatus, comprising: a plurality of waveguides arranged in a stack, each of the plurality of waveguides to transmit light to a first surface of the stack; and a plurality of light inhibiting layers interposed between each of the plurality of waveguides in the stack.

Example 13

The apparatus of example 12, each of the plurality of waveguides comprising an entrance pupil to receive light.

Example 14

The apparatus of example 13, the entrance pupils of first subset of the plurality of waveguides disposed on a second surface of the stack and the entrance pupils to a second subset of the plurality of waveguides disposed on a third surface of the stack.

Example 15

The apparatus of example 14, the second surface parallel to the third surface.

Example 16

The apparatus of example 14, the first surface perpendicular to the second surface and the third surface and the second surface parallel to the third surface.

Example 17

The apparatus of example 15, the entrance pupils to receive light from a light emitting diode (LED) and transmit the light to a liquid crystal display (LCD) layer of a display.

Example 18

The apparatus of example 14, each of the second surface and the third surface comprising an N/2×M array of entrance pupils, where M and N are greater than 2.

Example 19

The apparatus of example 12, each of the plurality of waveguides comprising an exit pupil, the first surface comprising an M×N array of exit pupils, wherein at least one of M or N are greater than 4.

Example 20

The apparatus of example 12, the light inhibiting layer comprising an opaque material or a reflective material.

Example 21

The apparatus of example 20, the light inhibiting layer comprising aluminum.

Example 22

The apparatus of any one of examples 12 to 21, wherein the apparatus is a light guide panel layer of a display.

Example 23

A method comprising: stacking a plurality of waveguides into a waveguide stack, each of the plurality of waveguides to transmit light to a first surface of the stack; and disposing a light inhibiting material between each of the plurality of waveguides.

Example 24

The method of example 23, comprising coating the plurality of waveguides in the light inhibiting material before stacking the plurality of waveguides into the waveguide stack.

Example 25

The method of example 23, comprising layering the lighting inhibiting material between the plurality of waveguides.

Example 26

The method of example 23, each of the plurality of waveguides comprising an entrance pupil to receive light.

Example 27

The method of example 26, the entrance pupils of first subset of the plurality of waveguides disposed on a second surface of the stack and the entrance pupils to a second subset of the plurality of waveguides disposed on a third surface of the stack.

Example 28

The method of example 27, the second surface parallel to the third surface.

Example 29

The method of example 27, the first surface perpendicular to the second surface and the third surface and the second surface parallel to the third surface.

Example 30

The method of example 28, the entrance pupils to receive light from a light emitting diode (LED) and transmit the light to a liquid crystal display (LCD) layer of a display.

Example 31

The method of example 27, each of the second surface and the third surface comprising an N/2×M array of entrance pupils, where M and N are greater than 2.

Example 32

The method of example 23, each of the plurality of waveguides comprising an exit pupil, the first surface comprising an M×N array of exit pupils, wherein at least one of M or N are greater than 4.

Example 33

The method of example 23, the light inhibiting material comprising aluminum.

Example 34

An apparatus comprising: a plurality of waveguide means arranged in a stack, the plurality of waveguide means to transmit light to a first surface of the stack; and light inhibiting layer means interposed between each of the plurality of waveguide means in the stack.

Example 35

The apparatus of example 34, each of the plurality of waveguide means comprising an entrance pupil to receive light.

Example 36

The apparatus of example 34, the entrance pupils of first subset of the plurality of waveguides disposed on a second surface of the stack and the entrance pupils to a second subset of the plurality of waveguide means disposed on a third surface of the stack.

Example 37

The apparatus of example 36, the second surface parallel to the third surface.

Example 38

The apparatus of example 36, the first surface perpendicular to the second surface and the third surface and the second surface parallel to the third surface.

Example 39

The apparatus of example 37, the entrance pupils to receive light from a light emitting diode (LED) and transmit the light to a liquid crystal display (LCD) layer of a display.

Example 40

The apparatus of example 36, each of the second surface and the third surface comprising an N/2×M array of entrance pupils, where M and N are greater than 2.

Example 41

The apparatus of example 34, each of the plurality of waveguide means comprising an exit pupil, the first surface comprising an M×N array of exit pupils, wherein at least one of M or N are greater than 4.

Example 42

The apparatus of example 24, the light inhibiting layer comprising an opaque material or a reflective material.

Example 43

The apparatus of example 42, the light inhibiting layer comprising aluminum.

Example 44

The apparatus of any one of examples 34 to 43, wherein the apparatus is a portion of a display means.

The invention claimed is:

1. A system, comprising:
 a display comprising a plurality of illumination segments arranged in an M×N array, where M and N are greater than 2 and at least one of M or N is greater than 4;
 a plurality of light emitting diode (LED) edge lights;
 a liquid crystal display (LCD) layer; and
 a waveguide stack to transmit light from the plurality of LED edge lights to the LCD layer, the waveguide stack comprising:
  a plurality of waveguides arranged in a stack, each of the plurality of waveguides including an entrance pupil to transmit light from a one of the plurality of LED edge lights to an exit pupil directed at a portion of the LCD layer, the exit pupils of the plurality of waveguides disposed on a first surface of the waveguide stack, the entrance pupils of a first subset of the plurality of waveguides disposed on a second surface of the stack and the entrance pupils of a second subset of the plurality of waveguides disposed on a third surface of the stack; and
  a plurality of light inhibiting layers interposed between each of the plurality of waveguides in the stack.

2. The system of claim 1, the second surface parallel to the third surface.

3. The system of claim 1, the first surface perpendicular to the second surface and the third surface and the second surface parallel to the third surface.

4. The system of claim 1, each of the second surface and the third surface comprising an N/2×M array of entrance pupils, where M and N are greater than 2.

5. The system of claim 1, the first surface comprising an M×N array of exit pupils, wherein at least one of M or N are greater than 4.

6. The system of claim 5, the display comprising an M×N array of illumination segments.

7. The system of claim 1, the plurality of light inhibiting layers comprising an opaque material or a reflective material.

8. The system of claim 7, the plurality of light inhibiting layers comprising aluminum.

9. The system of claim 1, comprising:
 a housing, the display disposed in the housing; and
 at least one of a processing unit, radio, battery, or interface device disposed in the housing and operably coupled to the display.

10. An apparatus, comprising:
 a plurality of waveguides arranged in a stack, each of the plurality of waveguides to transmit light from an entrance pupil to an exit pupil on a first surface of the stack, an entrance pupil to a first one of the plurality of waveguides on a second surface of the stack different than the first surface and an entrance pupil to a second one of the plurality of waveguides on a third surface of the stack different than the first surface and the second surface; and
 a plurality of light inhibiting layers interposed between the plurality of waveguides in the stack.

11. The apparatus of claim 10, the second surface parallel to the third surface.

12. The apparatus of claim 10, the first surface perpendicular to the second surface and the third surface and the second surface parallel to the third surface.

13. The apparatus of claim 11, the entrance pupils to receive light from a light emitting diode (LED) and transmit the light to a liquid crystal display (LCD) layer of a display.

14. The apparatus of claim 10, each of the second surface and the third surface comprising an N/2×M array of entrance pupils, where M and N are greater than 2.

15. The apparatus of claim 10, each of the plurality of waveguides comprising an exit pupil, the first surface comprising an M×N array of exit pupils, wherein at least one of M or N are greater than 4.

16. The apparatus of claim 10, the plurality of light inhibiting layers comprising an opaque material or a reflective material.

17. The apparatus of claim 16, the plurality of light inhibiting layers comprising aluminum.

18. The apparatus of claim 10, wherein the apparatus is a light guide panel layer of a display.

19. A system, comprising:
 a plurality of light emitting diode (LED) edge lights;
 a liquid crystal display (LCD) layer; and
 a waveguide stack to transmit light from the plurality of LED edge lights to the LCD layer, the waveguide stack comprising:
  a plurality of waveguides arranged in a stack, each of the plurality of waveguides including an entrance pupil to transmit light from a one of the plurality of LED edge lights to an exit pupil directed at a portion of the LCD layer, the exit pupils of the plurality of waveguides disposed on a first surface of the waveguide stack, the entrance pupils of at least a first one of the plurality of waveguides disposed on a second surface of the stack and the entrance pupils of at least a second one of the plurality of waveguides disposed on a third surface of the stack; and a light inhibiting layer interposed between each of the plurality of waveguides in the stack.

20. The system of claim 19, the second surface parallel to the third surface.

21. The system of claim 19, the first surface perpendicular to the second surface and the third surface and the second surface parallel to the third surface.

22. The system of claim 19, each of the second surface and the third surface comprising an N/2×M array of entrance pupils, where M and N are greater than 2.

23. The system of claim 19, the first surface comprising an M×N array of exit pupils, wherein at least one of M or N are greater than 4.

24. The system of claim 23, comprising a display comprising an M×N array of illumination segments.

25. The system of claim 19, the light inhibiting layers comprising an opaque material or a reflective material.

26. The system of claim 19, the light inhibiting layers comprising aluminum.

* * * * *